Figure 1:
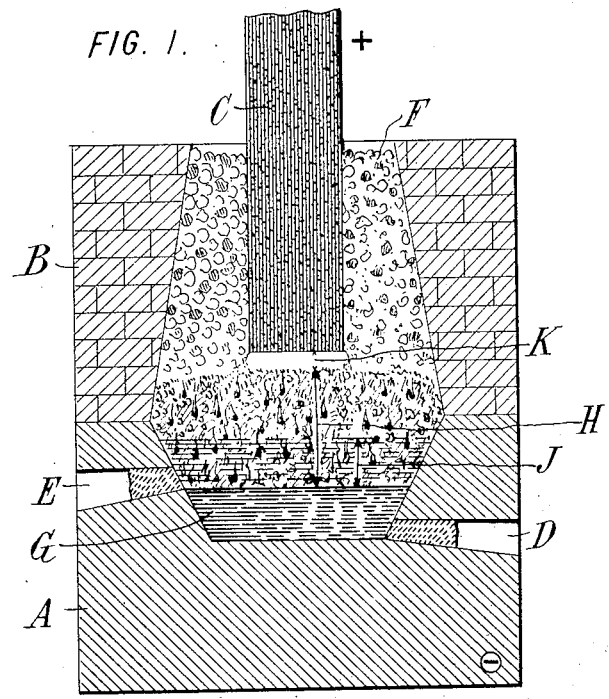

No. 861,280. PATENTED JULY 30, 1907.
P. L. T. HÉROULT.
ELECTRIC SMELTING.
APPLICATION FILED APR. 25, 1906.

WITNESSES:
Fred White
René Bruine

INVENTOR:
Paul Louis Toussaint Héroult,
By Attorneys,
Arthur E. Raser & Usina

UNITED STATES PATENT OFFICE.

PAUL LOUIS TOUSSAINT HÉROULT, OF LA PRAZ, FRANCE, ASSIGNOR TO SOCIETE ELECTRO-METALLURGIQUE FRANCAISE, OF FROGES, FRANCE.

ELECTRIC SMELTING.

No. 861,280.  Specification of Letters Patent.  Patented July 30, 1907.

Application filed April 25, 1906. Serial No. 313,580.

*To all whom it may concern:*

Be it known that I, PAUL LOUIS TOUSSAINT HÉROULT, a citizen of the Republic of France, residing at La Praz, Savoie, France, have invented certain new and useful Improvements in Electric Smelting, of which the following is a specification.

This invention aims to provide certain improvements in the smelting of iron or other ores in the electric furnace, and certain improvements in regulating the operation of an electric furnace. By this process the composition of the product may be very accurately determined and controlled, and a cast iron of any desired composition, containing for example any desired percentage of silicon, may be obtained from a variety of ores.

In the smelting of iron ore in a furnace of the usual type having a vertical electrode from the lower end of which the current passes to the base of the furnace, the charge of ore and carbon is passed through the zone of fusion, and by adding lime to the charge in excess of the quantity required to maintain the composition of the slag, the excess lime forms a scale or lining upon the side walls of the furnace, the thickness of which can be controlled by controlling the supply of lime. This scale diminishes the cross-section of the zone of fusion or reduction, thus concentrating the energy of the current through such cross-section, and causing the electrode to be lifted (by hand or by the usual automatic mechanism) to maintain the voltage and amperage constant. The increase in the length of the zone of fusion increases also the rate of reduction in this zone, and produces a pig of higher silicon content.

According to my theory of the operation, the carbon which forms the reducing element of the charge, collects below the electrode in a spongy mass or column extending from the molten metal in the bottom of the crucible nearly to the lower end of the electrode, and the arc proper extends from the lower end of the electrode to the top of the column of carbon. The smelting may be divided into two steps, first, the melting of the various oxids; this being accomplished in the immediate neighborhood of the arc and by radiation of heat therefrom. Second, the molten oxids trickle through the spongy column of incandescent carbon and are reduced to a greater or less extent to iron, silicon or other metallic elements, the degree of reduction depending to some extent upon the length of the column of carbon through which they must pass. The molten silicates and other matters forming the slag, float upon the iron throughout the interstices of the carbon, which is also floating upon the iron. Now when the cross-section of the column of carbon is contracted by introducing a lining of lime upon the walls of the crucible, the electrode is raised as above explained to maintain the resistance between the end of the electrode and the base of the crucible, the incandescent carbon column becomes longer, and this added resistance enables the arc to become a little shorter. Consequently there is less heat for the melting of the oxids of the charge, and the operation of the furnace is less rapid, but the oxids which are melted pass through a longer column of carbon and are more completely reduced. Since it is at least approximately true that the iron is first reduced and then the silicon, it follows that the elongation of the zone of fusion produces an increased silicon content in the product. Therefore it follows that by increasing the thickness of the scale referred to, the silicon content of the product is increased, or by decreasing the thickness of the scale the opposite effect is obtained.

The scale referred to forms automatically in accordance with the quantity of the desired material present. The accumulation is very rapid, and is progressive as long as the operator continues to supply more lime than the slag requires. To diminish the thickness of the scale, it is only necessary to supply less lime than the slag requires, whereupon the slag will continue to dissolve the scale until its equilibrium is restored. Because of the elongation of the column of carbon by the contraction of the zone of fusion, an increased quantity of carbon should be supplied to the charge simultaneously with the increased quantity of lime.

The accompanying drawings illustrate the operations in the furnace in accordance with the theory above outlined. It is to be understood, however, that these are merely diagrammatic.

Figure 2:
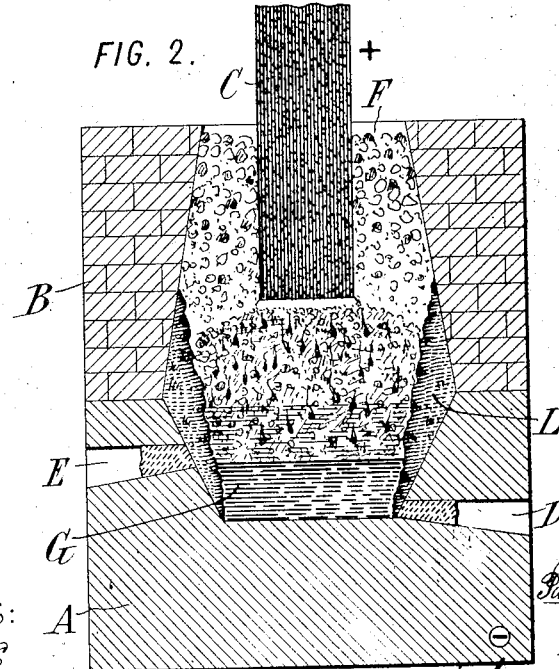

Figures 1 and 2 are vertical sections of an electric furnace, the first indicating the operation with only sufficient lime to supply the needs of the slag, and the second indicating the operation with an excessive supply of lime.

The walls constituting the crucible or body of the furnace, comprise a carbon base A and an upper portion B, usually of fire-brick, the electrode C entering from the upper end and the cables being connected respectively to the electrode C and the base A. The tap hole D is provided for drawing off the molten pig iron from the bottom, and a second tap-hole E at a higher elevation for drawing off the slag. The charge F comprises the ore mixed with coke or other form of carbon, and with limestone or other form of lime, in the usual quantities. After the furnace has been started and settled down to normal working, the molten iron will collect in a pool G at the bottom. Floating upon this and extending therefrom to points slightly beyond the end of the electrode, will be a column H composed largely or practically entirely of carbon in spongy form with interstices through which the masses melted above can percolate. The melted oxides and silicates constituting the slag, will collect in a layer J in the bottom of the carbon column and float upon the molten iron. Between the lower end of the electrode and the upper end of the column H, is the arc K.

What I have called the zone of fusion or reduction, extends from the base of the electrode to the bottom of the furnace, and is of varying width depending upon the inclination of the sides of the crucible. In contracting the width of this zone, it is primarily upon the column of carbon which I work, though ordinarily the contraction will extend up and below this column.
The furnace operates in fact as a combined arc and incandescent furnace, the passage of the current to the surface of the molten iron being first through the gaseous or other non-conducting space to form the short arc K, and thence through the incandescent column H.
Although there is a certain variation in the length of the arc inverse to the variation in the length of the incandescent column, and it cannot be strictly said that I operate upon one and not the other, yet the principal variations effected by my process are in the carbon column. The arc is the point of most intense heat within the furnace, and by radiation all around the lower end of the electrode the heat melts the ore, and the latter trickles in streams or drops through the spongy incandescent column H of carbon, where a certain portion of it is reduced to metal and runs into the molten pool G, while the remaining unreduced portion forms a part of the slag J.

Suppose now that the composition of the product does not show sufficient silicon. The operator throws in with the charge a measured quantity of lime and carbon in addition to that previously supplied. The excess lime being highly refractory and being unable to combine chemically with the slag, accumulates in a scale or lining L (Fig. 2) on the walls of the crucible.
The thickness of this lining can be accurately determined and controlled. The rise of the electrode under the action of the usual automatic constant current and constant voltage mechanism, will show an experienced operator where the scale is too thick or too thin. The scale has a subsidiary advantage in protecting the sides of the crucible from the materials in the furnace and preventing the passage of current except by way of the molten product G and the bottom of the crucible, thus enabling the walls of the crucible to wear a considerably longer time than where they are exposed to the direct action of the molten masses and the current. The column of carbon is elongated as shown, and the molten ore in passing therethrough is reduced to a greater extent than before. The gain in energy applied to the reduction of the ore, is compensated by a loss in the length of the arc K, and a consequent loss in the fusing power and rapidity of operation of the furnace. The drops or streams of molten ore are less rapid or voluminous, but they flow through a longer column of incandescent carbon, and therefore are reduced to a greater extent.

It is not essential that lime be used as the material for forming the scale. I have observed that the most refractory element or elements of the charge tend to form such a scale upon the sides of the furnace, and if supplied in excess of that required for the reactions involved, will act in the same way as lime. Silica for example may be used instead of lime.

The effect of restricting the cross-section of the zone of fusion, is also to create a higher heat at the point where the reducing action takes place, thus greatly increasing or favoring the reducing action. The increased heat also facilitates the dissolution of the carbon in the iron, aids in the desulfuration, and assists the reduction of the slag to introduce a high percentage of silicon in the pig and thus make it more valuable.

The process may be applied to other types of furnace than that shown, and may be said to include broadly the regulating of the operation of an electric furnace by varying the cross-section of the zone of fusion. Or when applied to smelting operations, the invention may be considered as including broadly the maintaining of a column of carbon or equivalent reducing material between the electrodes and through which the molten material passes, and varying the length of said column.

Changing the length and diameter of the column of carbon enables me also to alter the effective shape of the furnace to fit the best voltage and amperage for a given transformer or generator, so as to get out of an installation the best commercial result.

Therefore though I have described with great particularity of detail certain specific embodiments of the invention, it is not to be understood therefrom that the invention is limited to the particular embodiments disclosed.

Various modifications may be made by those skilled in the art, without departure from the invention.

What I claim is:—

1. In the smelting of iron ore in an electric furnace having an electrode from which the current passes to the base of the furnace, the process which consists in feeding a charge of ore and carbon in such proportion that the carbon forms a magma below the electrode and the ore is fused above the column and is reduced in passing therethrough and the molten iron collects at the bottom, and adding lime to the charge in quantities sufficient to form a scale of desired thickness at the sides of such column, thereby diminishing the cross-section of the column and thus concentrating the energy of the current through such cross-section, and raising the electrode so as to increase the length of the column and to increase the degree of reduction.

2. In the smelting of ore in an electric furnace, the process which consists in introducing with the charge a sufficient quantity of the most refractory material thereof to form a scale of desired thickness thus restricting the cross-section of the zone of fusion and thereby concentrating the energy of the current through such cross-section.

3. In the smelting of ore in an electric furnace, the process which consists in introducing with the charge a refractory material in sufficient quantity to form a scale of desired thickness on the walls of the furnace thus restricting the cross-section of the zone of fusion and thereby concentrating the energy of the current through such cross-section.

4. The process of smelting in an electric furnace which consists in maintaining a column of carbon between the electrodes and through which the molten material passes, and varying the length of said column so as to obtain saturation of the metal with carbon or production of silicon by increasing the heat.

5. The process of regulating the operation of an electric furnace which consists in forming a scale on the walls of the furnace and varying the thickness of such scale so as to alter the effective shape of the zone of fusion.

6. The process of regulating the operation of an electric furnace which consists in varying the cross-section of the zone of fusion and thereby varying the intensity of the current passing through such cross-section.

7. In the smelting of iron ore in an electric furnace, the process of varying the quality of the product which consists in introducing with the charge a varying quantity of lime in excess of that required by the slag.

8. In the smelting of ore in an electric furnace, the process of varying the quality of the product which consists in introducing with the charge a varying quantity of refractory material to form a scale of varying thickness upon the sides of the crucible so as to alter the effective shape of the zone of fusion.

In witness whereof, I have hereunto signed my name in the presence of two subscribing witnesses.

PAUL LOUIS TOUSSAINT HÉROULT.

Witnesses:
D. ANTHONY USINA,
FRED WHITE.